United States Patent [19]

Ishimatsu

[11] Patent Number: 5,436,775
[45] Date of Patent: Jul. 25, 1995

[54] MAGNETIC DISK DEVICE
[75] Inventor: Noriaki Ishimatsu, Tokyo, Japan
[73] Assignee: NEC Corporation, Tokyo, Japan
[21] Appl. No.: 251,220
[22] Filed: May 31, 1994
[30] Foreign Application Priority Data May 31, 1993 [JP] Japan .................................. 5-152731
May 31, 1993 [JP] Japan .................................. 5-152732

[51] Int. Cl.$^6$ ............................................. G11B 17/02
[52] U.S. Cl. .............................. 360/98.08; 360/99.12
[58] Field of Search ........................ 360/98.08, 99.12

[56] References Cited

U.S. PATENT DOCUMENTS

| | | | |
|---|---|---|---|
| 4,672,488 | 6/1987 | Wright | 360/98.08 |
| 4,764,828 | 8/1988 | Gollbach | 360/98.08 |

FOREIGN PATENT DOCUMENTS

| | | | |
|---|---|---|---|
| 3816975 | 11/1989 | Germany | 360/98.08 |
| 2-83875 | 3/1990 | Japan | 360/98.08 |
| 4-139677 | 5/1992 | Japan | 360/98.08 |
| 2023257 | 12/1979 | United Kingdom | 360/98.08 |

*Primary Examiner*—John H. Wolff
*Attorney, Agent, or Firm*—Sughrue, Mion, Zinn, Macpeak & Seas

[57] ABSTRACT

A magnetic disk device has a spindle hub fixed to a spindle shaft. The spindle hub includes a flange member formed at its lower end portion and an annular groove formed in the flange member. A plurality of magnetic disks and spacer rings are stacked alternately on the flange member of the spindle hub in an axial direction. A cylindrical support member disposed in the annular groove of the spindle hub to form a predetermined gap between its inner peripheral surface and an outer peripheral surface of the spindle hub, while an outer peripheral surface of the cylindrical support member contacts the inner peripheral surfaces of the plurality of magnetic disks and spacer rings. Another magnetic disk device has a spindle hub fixed to a spindle shaft. The spindle hub includes a flange member formed at its lower end portion and has at least two grooves formed on its outer periphery at a predetermined distance apart. A plurality of magnetic disks and spacer rings are stacked alternately on the flange member of the spindle hub in an axial direction. A cylindrical support member is interposed between the plurality of magnetic disks and spacer rings and the spindle hub to form a predetermined gap between its inner peripheral surface and an outer peripheral surface of the spindle hub, while an outer peripheral surface of the cylindrical support member contacts the inner peripheral surfaces of the plurality of magnetic disks and spacer rings. A resilient member is disposed in each of the grooves, and each resilient member contacts the inner peripheral surface of the cylindrical support member.

13 Claims, 2 Drawing Sheets

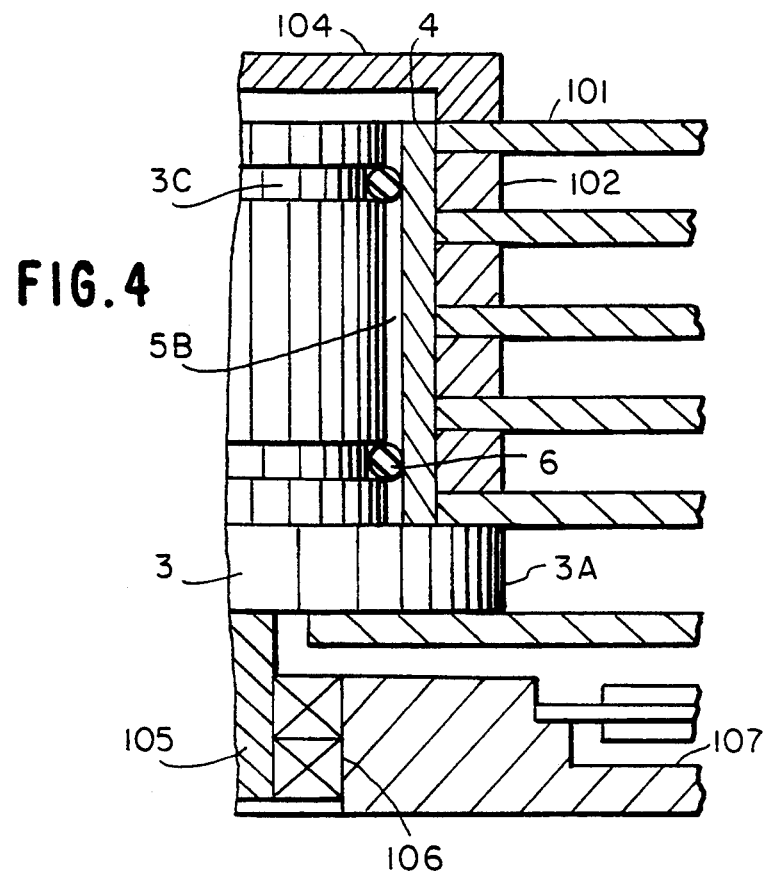
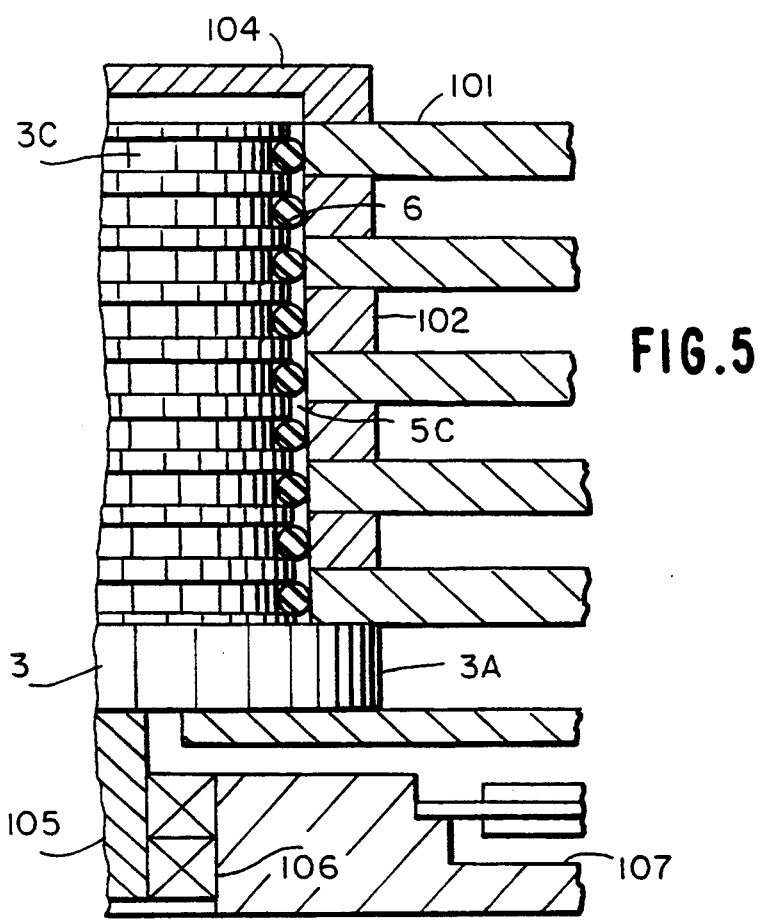

MAGNETIC DISK DEVICE

BACKGROUND OF THE INVENTION

1. Field of the Invention

The present invention relates to a magnetic disk device, and more particularly, to a magnetic disk device capable of substantially reducing the deviation of magnetic disks in a radial direction due to a change in ambient temperature, thus preventing the tracks of the magnetic disks from misaligning with the magnetic heads which read the disks.

2. Description of the Related Art

In general, a conventional magnetic disk device has a servo head for positioning magnetic heads, including a data head, relative to respective magnetic disks, and controls such positioning based on servo information read out from the magnetic disks by the servo head. An error in the relative position of the servo head and the data head for reading and writing data to and from a disk is known as an off-track condition, which is the deviation between an expected tracking position and an actual tracking position. Accordingly, the positioning is more accurate when this off-track condition is small.

In the conventional magnetic disk device, undesirable off-track conditions occur due to various factors. In particular, an off-track condition known as a thermal off-track condition is caused by a change in temperature in the magnetic disk device itself, or a change in the ambient temperature. This thermal off-track condition occurs primarily due to differences in the linear expansion coefficient between the constituent elements of the magnetic disk device.

As shown in FIG. 1, the conventional magnetic disk device has a spindle hub 103, fixed to a spindle shaft 105 which is inserted in a base plate 107 and rotatably supported by bearings 106. Magnetic disks 101 and spacer rings 102 are alternately stacked on the spindle hub 103 in an axial direction and fixed directly to an outer peripheral side of the spindle hub 103. Clamp ring 104 secures the magnetic disks 101 and the spacer rings 102 to the spindle hub 103.

In particular, as shown in FIG. 2, in the conventional magnetic disk device, the magnetic disks 101 and spacer rings 102 are alternately stacked and fixed to the spindle hub 103 by the clamp ring 104 while they directly contact the outer periphery of the spindle hub 103. Further, magnetic heads 108, corresponding to the magnetic disks 101, are mounted at one end of the positioner 109 which positions the magnetic heads 108 relative to their respective magnetic disks 101.

In the conventional magnetic disk device, since the magnetic disks 101 and the spacer rings 102 are directly in contact with the outer periphery of the spindle hub 103 when mounted thereto, displacement or deformation of the magnetic disks 101 in a radial direction easily occurs when the shape of the spindle hub 103 changes due to ambient temperature changes or the like.

For example, a conventional magnetic disk device is usually used in a ambient temperature ranging from −40° C. to 60° C. Hence, since the magnetic disks 101, the spacer rings 102 and the spindle hub 103 are in contact with each other and each made of different material, due to the difference in their thermal linear expansion coefficients, when the ambient temperature changes, displacement or deformation of the magnetic disks 101 can occur at the point at which they contact the spindle hub 103 and rings 102. Therefore, the irreversible deviation of the relative position of servo positioning data recorded on the servo information recording surface of the magnetic disks 101 and data recorded on the data recording surface of the magnetic disks 101 by a data head occurs, thus resulting in data read errors when the magnetic heads 108 attempt to read the data on the disks.

SUMMARY OF THE INVENTION

It is therefore an object of the present invention to eliminate the above-mentioned disadvantage of the conventional magnetic disk device by providing a magnetic disk device capable of substantially reducing the deviation of the magnetic disks in the radial direction, thereby preventing data read errors due to thermal off-track conditions.

According an embodiment of the present invention, a magnetic disk device comprises a spindle hub, fixed to a spindle shaft, and having a flange member formed at a lower end portion thereof and an annular groove formed in the flange member. A plurality of magnetic disks are mounted on the flange member of the spindle hub in an axial direction of the spindle shaft.

Further, a plurality of spacer rings are interposed respectively between the plurality of magnetic disks. Finally, a cylindrical support member is arranged in the annular groove of the spindle hub to form a predetermined gap between an inner peripheral surface thereof and an outer peripheral surface of the spindle hub, while an outer peripheral surface of the cylindrical support member contacts the inner peripheral surfaces of the plurality of magnetic disks and spacer rings.

According to another embodiment of the present invention, a magnetic disk device comprises a spindle hub, fixed to the spindle shaft, and having a flange member formed at a lower end portion thereof and two grooves formed on an outer peripheral side thereof at a predetermined distance from each other. A plurality of magnetic disks are mounted on the flange member of the spindle hub in an axial direction of the spindle shaft.

A plurality of spacer rings are interposed respectively between the plurality of magnetic disks. A cylindrical support member is interposed between the plurality of magnetic disks and spacer rings and the spindle hub to form a predetermined gap between an inner peripheral surface thereof and an outer peripheral surface of the spindle hub. An outer peripheral surface of the cylindrical support member contacts the inner peripheral surfaces of the plurality of magnetic disks and spacer rings. Finally, two resilient members are arranged respectively in the two grooves and each contact the inner peripheral surface of the cylindrical support member.

According to another embodiment of the present invention, a magnetic disk device comprises a spindle hub, fixed to the spindle shaft, and having a flange member formed at a lower end portion thereof. The spindle hub further has a plurality of grooves respectively formed on an outer peripheral thereof.

A plurality of magnetic disks are mounted on the flange member of the spindle hub in an axial direction of the spindle shaft. Also, a plurality of spacer rings are interposed respectively between the plurality of magnetic disks such that the centers of the inner peripheral surfaces of the plurality of magnetic disks and space rings each oppose one of the grooves in the spindle hub.

Further, a plurality of resilient members are disposed respectively in the plurality of grooves, and each resilient member contacts a center or substantially center position of an inner peripheral surface of a magnetic disk or spacer ring.

BRIEF DESCRIPTION OF THE DRAWINGS

The above objects and features of this invention will become more apparent from the following detailed description when taken in conjunction with the accompanying drawings, of which:

FIG. 4 is a cross-sectional view of another embodiment of a magnetic disk device according to the present invention; and FIG. 5 is a cross-sectional view of a further embodiment of a magnetic disk device according to the present invention.

DETAILED DESCRIPTION OF THE PREFERRED EMBODIMENTS

Figure 1:
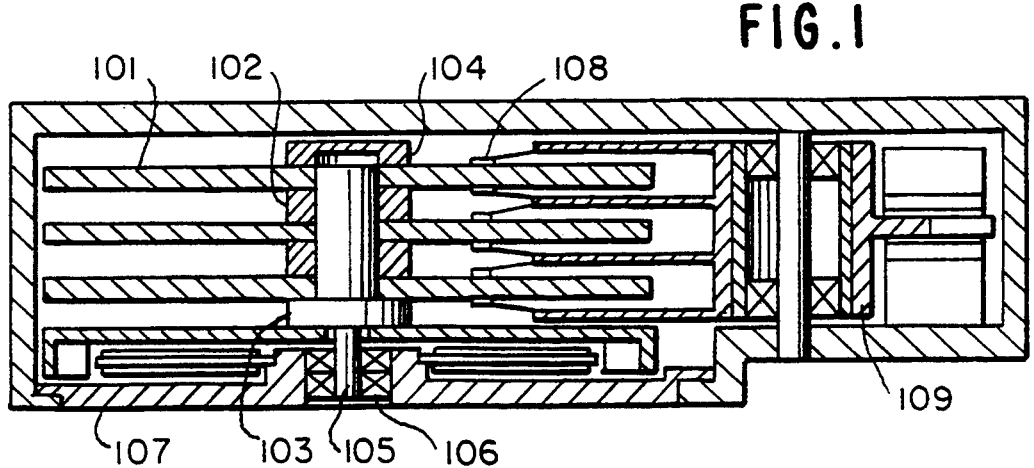
FIG. 1 is a cross-sectional view of a conventional magnetic disk device.
Figure 2:
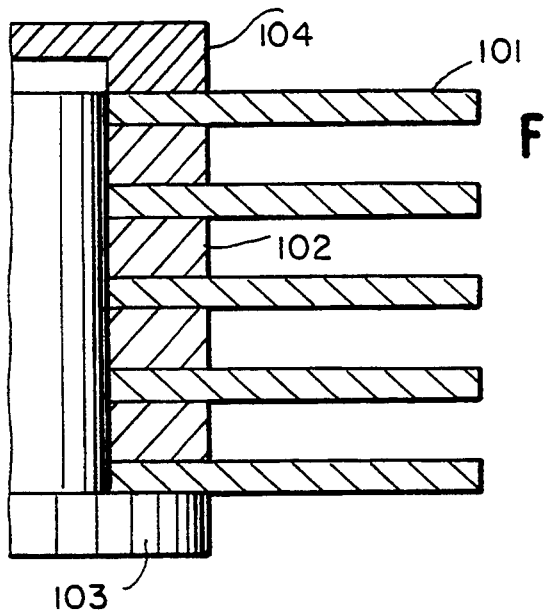
FIG. 2 is an enlarged view showing the mounting of the magnetic disks and spacer rings of the conventional magnetic disk device shown in FIG. 1.
Figure 3:
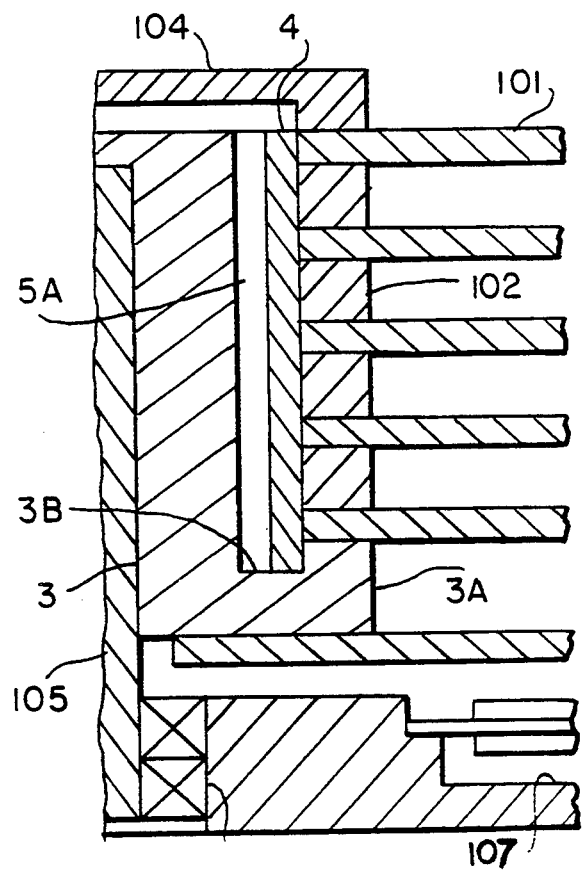
FIG. 3 is a cross-sectional view of an embodiment of a magnetic disk device according to the present invention.

As shown in FIG. 3, a first embodiment of the present invention comprises a spindle shaft 105 rotatably mounted in a base plate 107 by bearings 106. A spindle hub 3 is fixed to the spindle shaft 105 and has a flange member 3A formed at a lower end portion thereof and an annular groove 3B formed in the flange member 3A. A plurality of magnetic disks 101 are mounted on the flange member 3A of the spindle hub 3 in an axial direction of the spindle shaft 105.

A plurality of spacer rings 102 are interposed respectively between the plurality of magnetic disks 101, and a clamp ring 104 is mounted on the top of the spindle hub 3 to tightly secure the plurality of magnetic disks 101 and spacer rings 102 to the spindle hub. Further, a cylindrical support member 4 is disposed in the annular groove 3B of the spindle hub 3 to form a predetermined gap 5A between an inner peripheral surface thereof and an outer peripheral surface of the spindle hub 3. An outer peripheral surface of the cylindrical support member 4 contacts the inner peripheral surfaces of the plurality of magnetic disks 101 and spacer rings 102.

In this embodiment, the magnetic disks 101 and the spacer rings 102 may be made of aluminum, aluminum alloy, chemical tempered glass, ceramic glass or crystallized glass or the like. Their thermal linear expansion coefficients are approximately $24.2*10^{-6}[1/deg]$, $22.2*10^{-6}[1/deg]$, $7.7*10^{-6}[1/deg]$, $7.0*10^{-6}[1/deg]$ and $12.0*10^{-6}[1/deg]$, respectively. The cylindrical support member 4 is preferably made of a material having the same or substantially the same thermal linear expansion coefficient as that of a material of which the plurality of magnetic disks 101 and spacer rings 102 are made. On the other hand, the spindle hub 3 may be made of a material which is not similar to a material of which the plurality of magnetic disks 101 and spacer rings 102 are made.

According to the first embodiment of the present invention, since the magnetic disks 101, and the spacer rings 102 and the spindle hub 3 on which they are alternately stacked, are each made of different materials, the gap 5A formed between the spindle hub 3 and the cylindrical support member 4 is reduced due to the thermal expansion or thermal contraction of the spindle hub 3 in the radial direction. However, the gap 5A, which is determined, for example, in view of the difference in the thermal linear expansion coefficients of the spindle hub 3 and cylindrical support member 4, is larger than an amount by which the spindle hub 3 expands the thus, the spindle hub 3 itself does not contact the plurality of magnetic disks 101 and spacer rings 102 during expansion.

Furthermore, since the cylindrical support member 4 is made of a material having the same or substantially the same thermal linear expansion coefficient as that of a material of which the plurality of magnetic disks 101 and spacer rings 102 are made, and contacts the plurality of magnetic disks 101 and spacer rings 102, the cylindrical support member 4 also substantially compensates for the relative displacements between the plurality of magnetic disks 101 and spacer rings 102. As a result, the deviation of the magnetic disks 101 in the radial direction is substantially reduced, and data read errors due to the thermal off-track condition are minimized.

As shown in FIG. 4, a second embodiment of the present invention comprises a spindle shaft 105 rotatably mounted in a base plate 107 by bearings 106. A spindle hub 3 is fixed to the spindle shaft 105 and has a flange member 3A formed at the lower end portion thereof. The spindle hub 3 further has two grooves 3C formed on an outer peripheral side thereof at a predetermined distance from each other.

A plurality of magnetic disks 101 are mounted on the flange member 3A of the spindle hub 3 in an axial direction of the spindle shaft 105. A plurality of spacer rings 102 are interposed respectively between the plurality of magnetic disks 101, and a clamp ring 104 is mounted on the top of the spindle hub 3 to tightly secure the plurality of magnetic disks 101 and spacer rings 102 to the flange member 3A of the spindle hub 3.

Further, a cylindrical support member 4 is interposed between the plurality of magnetic disks 101 and spacer rings 102 and the spindle hub 3 to form a predetermined gap 5B between an inner peripheral surface thereof and an outer peripheral surface of the spindle hub 3. An outer peripheral surface of the cylindrical support member 4 contacts the inner peripheral surfaces of the plurality of magnetic disks 101 and spacer rings 102. Finally, two resilient members 6 are arranged respectively in the two grooves 3C and each contact the inner peripheral surface of the cylindrical support member 4.

In this embodiment, the magnetic disks 101 and the spacer rings 102 may be made of aluminum, aluminum alloy, chemical tempered glass, ceramic glass or crystallized glass or the like. Their thermal linear expansion coefficients are approximately $24.2*10^{-6}[1/deg]$, $22.2*10^{-6}[1/deg]$, $7.7*10^{-6}[1/deg]$, $7.0*10^{-6}[1/deg]$ and $12.0*10^{-6}[1/deg]$, respectively. The cylindrical support member 4 is preferably made of a material having the same or substantially the same thermal linear expansion coefficient as that of a material of which the plurality of magnetic disks 101 and spacer rings 102 are made. On the other hand, the spindle hub 3 may be made of a material which is not similar to a material of which the plurality of magnetic disks 101 and spacer rings 102 are made. The two resilient members 6 may be made of synthetic rubber of polymer resin, for example, fluorinated rubber, silicone rubber, fluororesin or silicone resin or the like.

According to the second embodiment of the present invention, since the magnetic disks 101 and the spacer rings 102, and the spindle hub 3 on which they are alternately stacked, are each made of different materials, the gap 5B formed between the spindle hub 3 and the cylindrical support member 4 is reduced due to the thermal expansion or thermal contraction of the spindle hub 3 in the radial direction. However, since the resilient members 6 are interposed between the spindle hub 3 and the cylindrical support member 4, the resilient members absorb the deviation or deformation of the spindle hub 3 due to thermal expansion or thermal contraction. Therefore, the spindle hub 3 does not contact the cylindrical support member 4, the plurality of magnetic disks 101 and spacer rings 102.

Furthermore, since the cylindrical support member 4 is made of a material having the same thermal linear expansion coefficient as that of a material of which the plurality of magnetic disks 101 and spacer rings 102 are made, and contact the plurality of magnetic disks 101 and spacer rings 102, the cylindrical support member 4 substantially compensates for the relative displacements between the plurality of magnetic disks 101 and spacer rings 102. As a result, the deviation of the magnetic disks 101 in the radial direction is substantially reduced and thus, data read errors due to the thermal off-track condition are minimized.

As shown in FIG. 5, a third embodiment of the present invention comprises a spindle shaft 105 rotatably mounted in a base plate 107 by bearings 106. A spindle hub 3 is fixed to the spindle shaft 105 and has a flange member 3A formed at lower end portion thereof.

A plurality of magnetic disks 101 are mounted on the flange member 3A of the spindle hub 3 in an axial direction of the spindle shaft 105. A plurality of spacer rings 102 are interposed respectively between the plurality of magnetic disks 101. The plurality of magnetic disks 101 and spacer rings 102 are mounted such that a predetermined gap 5C is formed between the plurality of magnetic disks 101 and spacer rings 102 and the spindle hub 3.

The spindle hub 3 further has a plurality of grooves 3C respectively formed on an outer peripheral side thereof at a center position where each inner peripheral surface of the magnetic disk 101 or spacer ring 102 is opposed to each groove 3C. A clamp ring 104 is mounted on the top of the spindle hub 3 to tightly secure the plurality of magnetic disks 101 and spacer rings 102 to the flange member 3A of the spindle hub 3. A plurality of resilient members 6 are disposed respectively in the plurality of grooves 3C so that substantially the center of each resilient member 6 directly contacts the center or substantially the center of an inner peripheral surface of a magnetic disk 101 or spacer ring 102.

In this embodiment, the magnetic disks 101 and the spacer rings 102 may be made of aluminum, aluminum alloy, chemical tempered glass, ceramic glass or crystallized glass or the like. Their thermal linear expansion coefficients are approximately $24.2*10^{-6}[1/\text{deg}]$, $22.2*10^{-6}[1/\text{deg}]$, $7.7*10^{-6}[1/\text{deg}]$, $7.0*10^{-6}[1/\text{deg}]$ and $12.0*10^{-6}[1/\text{deg}]$, respectively. The cylindrical support member 4 is preferably made of a material having the same or substantially the same thermal linear expansion coefficient as that of a material of which the plurality of magnetic disks 101 and spacer rings 102 are made. On the other hand, the spindle hub 3 may be made of a material which is not similar to a material of which the plurality of magnetic disks 101 and spacer rings 102 are made. The plurality of resilient members 6 may be made of synthetic rubber or polymer resin, for example, fluorinated rubber silicone rubber, fluororesin or silicone resin or the like.

According to the third embodiment of the present invention, since the magnetic disks 101 and the spacer rings 102, and the spindle hub 3 on which they are alternately stacked, are each made of different materials, the gap 5C formed between the spindle hub 3 and the plurality of magnetic disks 101 and spacer rings 102 is reduced due to the thermal expansion or thermal contraction of the spindle hub 3 in the radial direction. However, since the plurality of resilient members 6 are respectively arranged in the plurality of grooves 3C and directly contact the inner peripheral surfaces of the plurality of magnetic disks 101 and spacer rings 102 at a center position where each magnetic disk 101 or spacer ring 102 is opposed to each groove 3C, the resilient members 6 absorb the deviation or deformation of the spindle hub 3 due to thermal expansion or thermal contraction.

Therefore, the spindle hub 3 does not contact the plurality of magnetic disks 101 and spacer rings 102. Hence, the deviation of the magnetic disks 101 in the radial direction is substantially reduced, and read errors due to the thermal off-track condition are minimized.

Although the present invention has been fully described by way of a preferred embodiment thereof with reference to the accompanying drawings, various changes and modifications will be apparent to those having skill in this field. Therefore, unless these changes and modifications otherwise depart from the scope of the present invention, they should be construed as included therein.

What is claimed is:

1. A magnetic disk device, comprising:
   a spindle hub, fixed to a spindle shaft, and having a flange member formed at a lower end portion of the spindle hub and an annular groove formed in said flange member;
   a plurality of magnetic disks mounted on said flange member of said spindle hub in an axial direction of said spindle shaft, each said magnetic disk having an inner peripheral disk surface defining a central cylindrical disk aperture;
   a plurality of spacer rings interposed respectively between said plurality of magnetic disks, each said spacer ring having an inner peripheral spacer surface defining a central cylindrical spacer aperture; and
   a cylindrical support member, disposed in said annular groove of said spindle hub, to form a gap between an inner peripheral surface of said cylindrical support member and an outer peripheral surface of said spindle hub, such that an outer peripheral surface of said cylindrical support member contacts said inner peripheral disk and spacer surfaces.

2. A magnetic disk device as claimed in claim 1, wherein said cylindrical support member is made of a material having the same linear expansion coefficient as that of a material of which said plurality of magnetic disks are made.

3. A magnetic disk device as claimed in claim 1, wherein said cylindrical support member is made of one of aluminum, aluminum alloy, chemical tempered glass, ceramic glass and crystallized glass.

4. A magnetic disk device as claimed in claim 2, wherein said cylindrical support member is made of one of aluminum, aluminum alloy, chemical tempered glass, ceramic glass and crystallized glass.

5. A magnetic disk device, comprising:

a spindle hub, fixed to a spindle shaft, and having a flange member formed at a lower end portion of the spindle hub and at least two grooves formed on an outer peripheral side of the spindle hub at a predetermined distance apart from each other;

a plurality of magnetic disks mounted on said flange member of said spindle hub in an axial direction of said spindle shaft, each said magnetic disk having an inner peripheral disk surface defining a central cylindrical disk aperture;

a plurality of spacer rings interposed respectively between said plurality of magnetic disks, each said spacer ring having an inner peripheral spacer surface defining a central cylindrical spacer aperture;

a cylindrical support member, interposed between said spindle hub and said plurality of magnetic disks and spacer rings, to form a predetermined gap between an inner peripheral surface of said cylindrical support member and an outer peripheral surface of said spindle hub, such that an outer peripheral surface of said cylindrical support member contacts said inner peripheral disk and spacer surfaces; and at least two resilient members arranged respectively in said at least two grooves and contacting said inner peripheral surface of said cylindrical support member.

6. A magnetic disk device as claimed in claim 5, wherein said cylindrical support member is made of a material having a linear expansion coefficient which is substantially similar to that of a material of which said plurality of magnetic disks are made.

7. A magnetic disk device as claimed in claims 5, wherein said cylindrical support member is made of one of aluminum, aluminum alloy, chemical tempered glass, ceramic glass and crystallized glass.

8. A magnetic disk device as claimed in claims 6, wherein said cylindrical support member is made of one of aluminum, aluminum alloy, chemical tempered glass, ceramic glass and crystallized glass.

9. A magnetic disk device as claimed in claim 5, wherein said at least two resilient members are made of one of fluorinated rubber, silicone rubber, fluororesin and silicone resin.

10. A magnetic disk device, comprising:

a spindle hub, fixed to a spindle shaft, and having a flange member formed at a lower end portion of the spindle hub and a plurality of grooves formed on an outer peripheral side of the spindle hub at predetermined positions;

a plurality of magnetic disks mounted on said flange member of said spindle hub in an axial direction of said spindle shaft, each said magnetic disk having an inner peripheral disk surface defining a central cylindrical disk aperture;

a plurality of spacer rings, interposed respectively between said plurality of magnetic disks, each said spacer ring having an inner peripheral spacer surface defining a central cylindrical spacer aperture; and a plurality of resilient members disposed respectively in said plurality of grooves, each respective resilient member contacting a respective surface, the respective surface being one of said inner peripheral disk and spacer surfaces.

11. A magnetic disk device as claimed in claim 10, wherein each said respective resilient member contacts said respective surface at a center position of said respective surface such that each said respective surface is opposed to a respective one of said plurality of grooves.

12. A magnetic disk device as claimed in claims 10, wherein said plurality of resilient members are made of one of fluorinated rubber, silicone rubber, fluororesin and silicone resin.

13. A magnetic disk device as claimed in claims 11, wherein said plurality of resilient members are made of one of fluorinated rubber, silicone rubber, fluororesin and silicone resin.

* * * * *